United States Patent

[11] 3,599,716

| [72] | Inventor | James L. Thompson |
| | | Tulsa, Okla. |
| [21] | Appl. No. | 814,803 |
| [22] | Filed | Apr. 9, 1969 |
| [45] | Patented | Aug. 17, 1971 |
| [73] | Assignee | Atlantic Richfield Company |

[54] METHOD FOR SECONDARY OIL RECOVERY
12 Claims, No Drawings

[52] U.S. Cl.......................................................... 166/273, 166/274
[51] Int. Cl......................................................... E21b 43/22
[50] Field of Search............................................ 166/274, 275, 263, 273

[56] References Cited
UNITED STATES PATENTS

| 3,302,713 | 2/1967 | Ahearn et al. | 166/275 X |
| 3,036,631 | 5/1962 | Holbrook | 166/263 |
| 3,477,508 | 11/1969 | Hurd | 166/275 X |

*Primary Examiner*—Stephen J. Novosad
*Attorney*—McLean, Morton and Boustead

ABSTRACT: A secondary oil recovery method which comprises successively injecting into a subterranean oil-bearing formation air and water, e.g. as alternate slugs. The water has dissolved therein a surfactant and an acid or base to increase the efficiency of the surfactant.

METHOD FOR SECONDARY OIL RECOVERY

This invention relates to methods of secondary recovery of oil from depleted reservoirs, and more particularly to methods of secondary oil recovery by a water driven air slug process having a surfactant incorporated in the water.

It is well known in the art that an oil-containing reservoir, when depleted to a point where it is no longer profitable to produce oil by a pumping operation, may still contain as much as 50 percent or more of the oil originally in place. Many methods, referred to as secondary recovery methods, have been proposed in the past for the recovery of a part of this residual oil. One such method, which has had some degree of success, comprises injecting into the underground oil-bearing formation water to force the crude petroleum towards an output or production well. Also, it is known to use the alternate injection of water and gas, e.g. carbon dioxide, natural gas, air, etc. However, oil recovery by waterflooding or water and gas injection is inefficient because of capillary retention of oil in the reservoir rock pore spaces. The inefficiency of the prior art methods appears to be at least partially due to the fact that the connate water contained in the reservoir tends to build up as a bank ahead of the water. This prevents contact of the floodwater with the oil bank which develops ahead of the displaced connate water. Consequently, the benefits to be gained by lowering the interfacial tension between the oil and floodwater are not realized at the interface between the oil and floodwater where it is most needed.

One attempt to improve waterflood techniques involves the introduction of surface-active agents, i.e. surfactants into the floodwater to minimize the effect of capillary retention, so that the trapped oil can be recovered. The literature pertaining to the use of surfactants in waterflooding indicates that connate water banks up ahead of the injected water and it is this bank that displaces the reservoir oil. Studies also show that surfactants which improve waterflood oil recovery are usually strongly adsorbed on the reservoir rock. As a result, the surfactant lags behind the waterflood displacement front. Because of surfactant lag and banking of connate water, a conventional waterflood takes place ahead of the surfactant flood. Another improved waterflood technique attempted consists of adding sodium hydroxide (caustic) in the surfactant waterflood solution. However, the use of caustic-surfactant solutions has not been practical because of the excessive adsorption of the surfactant on the rock surfaces.

In general, the method of this invention is a modified waterflood process wherein the water contains a surfactant and another component such as caustic, which is designed for efficient secondary recovery of oil from oil bearing formations. In this process an oxygen-containing gas such as air is first injected into the oil bearing formation through an input well, or wells, to force the crude oil through the formation towards an output, or production, well or wells and subsequently an aqueous surfactant, e.g. caustic-surfactant solution is injected into the formation and moved toward the output well behind the slug of air. This procedure can be followed by the injection of alternate slugs of air and solution. The exposure of the crude oil to oxygen results in oxidation of crude oil to form in-situ surface active components or agents in the reservoir. The in-situ surface-active agents so formed are adsorbed on the reservoir rock surfaces to act as a shield and prevent the later adsorption of the surfactants which are introduced in the aqueous solution. In addition, the air injection obtains additional oil recovery by gas displacement. Basic materials other than sodium hydroxide, and acids can be added to the surfactant solution to increase the efficiency of the aqueous solution of surfactants, as more fully discussed below.

The quantity of each fluid injected, i.e. water and air, is sufficient to produce a slug of each fluid pushing ahead the preceding fluid. Also, sufficient air is injected to oxidize the crude oil and form the in-situ surface active agents or components in an amount sufficient to improve recovery of the crude oil using the method of this invention. The measure of this feature of the invention is in the amount of surfactant in the injected solution which is lost by adsorption to the reservoir. The volumes of air injected according to this invention will generally be about 0.5 to 50 percent, preferably about 5 to 15 percent of the total pore volume of the reservoir. Aqueous surfactant solution injection behind the air slug can continue until the solution-to-oil ratio at the production well is uneconomically high, or alternate slugs of air and caustic-surfactant solution can be used. The volume of solution injected to produce the slug of solution arranged between the two air slugs in an alternate slug method is also about 0.5 to 50 percent, preferably 5 to 15 percent of the total pore volume of the reservoir.

Various surfactants, i.e. surface active agents, can be used in this process. In general, the surface-active agents to be used must be water soluble and should be active, i.e. should reduce interfacial tensions between the waterflood and crude oil in low concentrations. Preferably, the surfactant should reduce interfacial tension to less than 1 dyne/cm. in concentrations of less than 0.1 percent wt. surfactant in the waterflood solution although in general such a reduction in concentrations of up to about 1 percent wt. surfactant can be acceptable. The surfactant must also exhibit a good transport rate in the reservoir system in which the crude oil has been contacted with air and also maintain chemical stability over a wide range of pH, generally over a range of about pH 3, or 4, to pH 12. The transport rate can be defined by the adsorption of the surfactant on the reservoir rock which, in general, should not exceed about $1000 \times 10^{16}$ gm., preferably about $100 \times 10^{16}$ gm., or less, particularly less than $30 \times 10^{16}$ gm., active agent per gram sand, i.e. reservoir rock. In addition, such surfactants should be compatible with the caustic, or acid, to be used in the aqueous waterflood solution and should be insoluble or only slightly soluble in hydrocarbons. Generally, the surfactants are used in an amount sufficient to reduce the interfacial tension to less than 1 dyne/cm., to improve the petroleum recovery and up to the limit of their solubility. Concentrations of surfactant in the waterflood of from about 0.01 percent wt. up to about .5 percent wt., or 10 percent wt., particularly less than 1 percent, or 2 percent wt. are suitable with the upper limit actually being determined by economic considerations and solubility of the surfactant in water. Suitable surfactants include the commercially available phosphate ester surfactants, organo-silicone surfactants, and others. Such surfactants which are compatible with caustic include as phosphate ester surfactants Agent 291–84 and Agent 332–81 produced by Stephens Chemical Company and as an organo-silicone surfactant L–77 produced by Union Carbide Chemicals. Triton QS–30 produced by Rohm and Hass Company is also a phosphate structural type surfactant. Surfactant QS–44 produced by Rohm and Hass Company is compatible with acidic solutions. One particularly suitable group of surfactants are the water-soluble polyoxyalkylene phosphate ester surfactants of the general type R-O PO$_3$H$_2$ and (R-O)$_2$ PO$_2$H, particularly in the free acid form although metal salts of these surfactants can be used as well. R represents an alkyl radical or an alkylaryl radical, the alkyl in each case having from about 8 to 20 or more carbon atoms, which has been modified by the addition of alkylene oxides, e.g. in ratios of, for example, ethylene oxide to phosphate of about 1:1 to 40:1, particularly 1:1 to 25:1. These surfactants are available in both free acid and metal salt forms with some being water-soluble whereas others are oil-soluble. In are used. These surfactant types can be characterized by the formula:

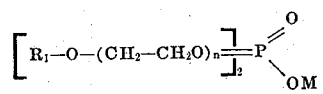

and

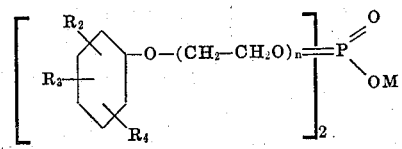

wherein $R_1$ represents an alkyl radical containing from about eight to 20, or more, e.g. 27 carbon atoms, e.g. octyl, nonyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, and heptacosyl radicals, $R_2$ represents an alkyl of about five to 27 carbon atoms, e.g. pentyl, heptyl, hexyl, etc., including higher alkyls of the same value as $R_1$, cycloalkyl, e.g. cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethylcyclopropyl, 1,2,3-trimethylcyclopropyl, 1,1-dimethylcyclopentyl, 1,2-dimethylcyclopentyl, 1,3-dimethylcyclopentyl, 1,2-dimethylcyclohexyl, 1,3-dimethylcyclohexyl, 1,4-dimethylcyclohexyl, ethylcyclohexyl, ethylmethylcyclopentyl, 1,1,2-trimethylcyclopentyl, cyclononyl, propylcyclohexyl, 1,2,4-trimethylcyclohexyl, 1,3,5trimethylcyclohexyl, 1-isopropyl-4-methylcyclohexyl, 1,2,4,5-tetramethylcyclohexyl, and "keryl" radicals derived from mineral oils containing alkyl, cycloalkyl and mixed alkyl-cycloalkyl radicals having from about 12 to 27 carbon atoms, $R_3$ and $R_4$ represent either hydrogen, alkyl of from about one to 22 carbon atoms, e.g. methyl, ethyl, propyl, butyl, and the higher alkyls defined by $R_1$ and cycloalkyls defined by $R_2$ or "keryl" radicals derived from mineral oils, $n$ represents the degree of oxyethylenation which ranges from about 1 to 40 moles of ethylene oxide per mole of phenolic or straight or branched chain alcohol compounds, and M represents hydrogen, ammonium radical, metals, for example, the alkaline earth metals such as barium or alkali metals such as sodium, potassium and lithium; lower alkyl or hydroxy lower alkyl ammonium radicals such as mono, di, and trimethyl ammonium; mono, di, and tri-($\beta$-hydroxyethyl) ammonium; mono, di, and triisopropyl ammonium. The free acids and monoester salts can be characterized by formulas such as the above in which no metal or only one ester group are present. Preferred surface active agents include the free acid, water soluble polyoxyethylene phosphates, particularly the free acid polyoxyethylene phosphate known as RM–410, produced by General Aniline and Film Corporation.

As mentioned above, the aqueous surfactant-containing waterflood solution also usually contains a base, e.g. caustic or acid. The addition of caustic or acid is to increase the efficiency of the surfactant solution. Suitable bases are sodium hydroxide, potassium hydroxide, ammonium hydroxide, etc., and suitable acids are hydrochloric acid, nitric acid, acetic acid, sulfuric acid, etc. Whether an acid or a base is preferred will depend upon the particular surfactant as well as the particular crude oil-reservoir system. When used, caustic, or acid, is generally added in amounts of about 0.1 to 25 percent wt., preferably about 0.1 to 10 percent wt.

The effectiveness of the method of this invention is demonstrated by the following Examples.

EXAMPLE I

Crude oil-water interfacial tension measurements were made with a pendant drop apparatus as described by E. W. Hough et al. in *Producer's Monthly*, 25, May, 1961, 21. The effect of different amounts of sodium hydroxide and RG–410 surfactant dissolved in 100,000 p.p.m. brine (10 percent aqueous brine solution) was investigated. With these chemicals in 100,000 p.p.m. brine, interfacial tensions were too low to measure with the conventional apparatus. In order to obtain smaller drop measurements, a 30-gauge hypodermic needle was used instead of the 25-gauge needle and a 35 mm. Praktica camera replaced the eyepiece. The camera was used to photograph the drops instead of obtaining manual measurements. The dimensions were measured from the negatives by projecting the images of the drops on a grated screen using a Triad projector. Even with these modifications, the small drops formed near the optimum chemical concentrations decreased so rapidly with time that the measurements were made at an age of 10 seconds in order to obtain comparable data. The results are presented in Table I.

TABLE I

| Solution | Interfacial Tension Between Solution and B. B. Jones, Cushing Field, Crude Dynes/cm. |
| --- | --- |
| 1.00% RG-410 in 10% Brine | 10.7 |
| 0.75% NaOH in 10% Brine | 4.6 |
| 1.88% NaOH in 10% Brine | 2.5 |
| 3.78% NaOH in 10% Brine | 2.6 |
| 5.30% NaOh in 10% Brine | 2.4 |
| 7.59% NaOH in 10% Brine | 2.7 |
| 0.38% NaOH and 0.38% RG-410 in 10% Brine | 0.3 |
| 0.08 % NaOH and 0.08 percent RG-410 in 10% Brine | 1.5 |
| 0.19% NaOH and 0.19% RG-410 in 10% Brine | 0.9 |

EXAMPLE II

Three displacement tests were performed. In preparation for each flooding test, three Berea sandstone cores were cleaned, dried and weighed. The cores were then evacuated, saturated under high pressure with 100,000 p.p.m. brine, and weighed again to obtain the pore volume. The cores were brought to an irreducible brine saturation by flooding with Klearol mineral oil. The Klearol was then completely displaced from the core with Bartlesville crude oil. The cores were aged at 100° F., the reservoir temperature, until imbibition tests indicated that wetting equilibrium had been obtained. Tests were performed in watered-out systems using each of the following concentrations of chemicals in 100,000 p.p.m. brine:

CORE A

Sodium hydroxide at 0.38 percent by weight,

CORE B

RG–410 at 0.38 percent by weight, and

CORE C

RG–410 and sodium hydroxide both at 0.38 percent by weight. Table II clearly demonstrates the effectiveness of the caustic-surfactant solutions.

TABLE II

| Properties of Core | Core A | Core B | Core C |
| --- | --- | --- | --- |
| Length | 9.23 cm. | 9.37 cm. | 9.41 cm. |
| Diameter | 3.16 cm. | 3.17 cm. | 3.15 cm. |
| Cross-sectional Area | 7.85 cm.$^2$ | 7.89 cm.$^2$ | 7.79 cm.$^2$ |
| Bulk Volume | 72.46 cm.$^3$ | 72.93 cm.$^3$ | 73.30 cm.$^3$ |
| Pore Volume | 15.84 cm.$^3$ | 15.66 cm.$^3$ | 16.06 cm.$^3$ |
| Porosity | 21.9% | 21.1% | 21.9% |
| Fluid Initial Saturation | % PV | % PV | % PV |
| Initial Oil Saturation | 75.4 | 78.2 | 76.0 |
| Initial Water Saturation | 24.6 | 21.8 | 24.0 |
| Flooding Data During Waterflood | | | |
| Oil Recovery at Breakthrough | 30.0 | 32.6 | 33.0 |
| Oil Saturation at Breakthrough | 45.4 | 45.7 | 43.0 |
| Water Saturation at Breakthrough | 54.5 | 54.3 | 57.0 |
| Oil Recovery during Waterflood | 30.3 | 32.7 | 33.0 |
| Oil Saturation after Waterflood | 45.1 | 45.5 | 43.0 |
| Water Saturation after Waterflood | 54.9 | 54.5 | 57.0 |
| Flooding Data During Surfactant Flood | | | |
| Oil Recovery during Surfactant Flood | 1.3 | 0.0 | 6.5 |
| Oil Saturation after Surfactant Flood | 43.9 | 45.5 | 36.4 |
| Water Saturation after Surfactant Flood | 56.1 | 54.5 | 63.6 |

EXAMPLE III

Displacement tests were conducted with four Berea sandstone cores at 500 p.s.i. and 100° F. with each core rotated at 4 revolutions per minute to minimize gravity effects. The cores were initially saturated with Klearol mineral oil at irreducible water saturation. The Klearol was completely displaced with Bartlesville crude oil. The cores were aged at 100° F. for 850 hours to obtain wetting equilibrium. Then four displacement tests were performed:

CORE A. The core was flooded with 100,000 p.p.m. brine until oil production ceased. Then injection of four alternate slugs of 100,000 p.p.m. brine (1 PV.) and nitrogen (1 PV.) were performed.

CORE B. The core was watered-out and then subjected to the injection of four injections of alternate slugs of air (1 PV.) and caustic-surfactant solutions (1 PV.).

CORE C. The core was watered-out and then four injections of alternate slugs of nitrogen (1 PV.) and caustic-surfactant solutions (1 PV.) were performed.

CORE D. The same procedure was performed with the core as CORE B. These tests were to determine the reproducibility of the flooding behavior.

The caustic-surfactant solution contained 0.38 percent by weight of RG–410 and sodium hydroxide. Table III sets forth the results of these tests:

TABLE III

| | Core A | Core B | Core C | Core D |
|---|---|---|---|---|
| Initial oil saturation, percent PV | 78.89 | 78.28 | 77.22 | 77.90 |
| Oil recovery by waterflooding, percent PV | 39.45 | 39.32 | 40.22 | 38.35 |
| Oil saturation after waterflood, percent PV | 39.44 | 38.96 | 38.61 | 39.55 |
| Oil recovery by 1st gas injection, percent PV | 1.11 | 1.77 | 1.61 | 2.16 |
| Oil saturation after 1st gas injection, percent PV | 38.33 | 37.19 | 37.00 | 37.39 |
| Oil recovery by 1st water injection, percent PV | 1.78 | 2.79 | 2.76 | 3.71 |
| Oil saturation after 1st water injection, percent PV | 36.55 | 34.40 | 34.24 | 33.68 |
| Oil recovery by 2nd gas injection, percent PV | 0.45 | 1.51 | 0.46 | 1.92 |
| Oil saturation after 2nd gas injection, percent PV | 36.10 | 32.89 | 33.78 | 31.76 |
| Oil recovery by 2nd water injection, percent PV | 2.01 | 2.28 | 1.61 | 1.80 |
| Oil saturation after 2nd water injection, percent PV | 34.08 | 30.61 | 32.17 | 29.96 |
| Oil recovery by 3rd gas injection, percent PV | 0.44 | 0.26 | 0.23 | 0.84 |
| Oil saturation after 3rd gas injection, percent PV | 33.65 | 30.35 | 31.94 | 29.12 |
| Oil recovery by 3rd water injection, percent PV | 0.85 | 1.01 | 0.69 | 1.68 |
| Oil saturation after 3rd water injection, percent PV | 32.80 | 29.34 | 31.25 | 27.44 |
| Oil recovery by 4th gas injection, percent PV | 0.11 | 1.26 | 0.23 | 0.71 |
| Oil saturation after 4th gas injection, percent PV | 32.69 | 28.08 | 31.02 | 26.73 |
| Oil recovery by 4th water injection, percent PV | 0.20 | 1.27 | 0.23 | 0.84 |
| Oil saturation after 4th water injection, percent PV | 32.49 | 26.81 | 30.79 | 23.89 |
| Percent increase in oil recovery over and above conventional waterflood, percent HCPV | 18 | 31 | 20 | 35 |

EXAMPLE IV

The same procedure as with CORE B, example III, is performed with surfactants, Agent 291–84, Agent 332–81 and Triton QS–30, respectively, replacing the RG–410 surfactant to displace crude oil from the watered-out core.

EXAMPLE V

The same procedure as with CORE B, example III, is performed with hydrochloric acid replacing the caustic and QS–44 the surfactant to displace crude oil from the watered-out core.

EXAMPLE VI

The same procedure as with CORE B, example III, is performed with potassium hydroxide and ammonium hydroxide, respectively, replacing the sodium hydroxide to displace the crude oil from the watered-out core.

We claim:

1. In a method for recovery of crude oil from a subterranean oil-bearing formation, the steps which comprise successively injecting into the formation from an input well firstly an oxygen-containing gas in an amount sufficient to produce a slug thereof in the formation pushing ahead the crude oil and sufficient to produce in-situ surface active components in the crude oil, and thereafter injecting surfactant-containing water solution into the formation from said input well in an amount sufficient to push the gas slug through the formation and to drive the crude oil through the formation to an output well, said water solution having dissolved therein a water-soluble surfactant which is compatible with the crude oil and reduces interfacial tensions between the water and crude oil to below 1 dyne/cm. when added to the water in amounts less than 1 wt. percent, said gas being injected in an amount sufficient to ensure that the adsorption of said surfactant on said formation is less than $100 \times 10^{16}$ grams per gram formation sand and recovering oil from the output well.

2. The method of claim 1 wherein the adsorption is less than $30 \times 10^{16}$ grams per gram formation sand.

3. The method of claim 1 wherein the surfactant is added to the solution in amounts of less than 5 wt. percent.

4. The method of claim 3 wherein the surfactant-containing water solution includes an alkaline material selected from the group consisting of sodium hydroxide, potassium hydroxide and ammonium hydroxide in an amount of from about 0.1 to 25 wt. percent.

5. The method of claim 1 wherein the surfactant-containing solution is injected into the formation in an amount of from about 0.5 percent to 50 percent of the pore volume of the formation to form an intermediate slug and further including injecting additional oxygen-containing gas into the formation to produce a second slug thereof behind said intermediate slug and thereafter injecting additional solution into said formation from the input well to push the second air slug, the intermediate slug and the first-formed air slug through said formation to the output well.

6. A method for secondary recovery of crude oil from a subterranean oil-bearing formation which comprises injecting into the formation from an input well firstly an oxygen-containing gas in an amount sufficient to produce a slug thereof in the formation pushing ahead the crude oil and sufficient to produce in-situ surface active components in the crude oil and thereafter injecting a surfactant-containing aqueous caustic solution into the formation from said input well in an amount sufficient to push the gas slug through the formation and to drive the crude oil through the formation to an output well, said solution having dissolved therein a water-soluble polyoxyalkylene phosphate ester surfactant or a metal salt thereof, of the general type $R\text{-}OPO_3H_2$ and $(R\text{-}O)_2PO_2H$ in an amount sufficient to reduce the interfacial tension between the solution and crude oil to below 1 dyne/cm. and also an alkaline material in an amount sufficient to increase the efficiency of the surfactant in the solution, said amount of alkaline material being between 0.1 and 25 wt. percent of the solution, and thereafter recovering crude oil at the output well.

7. The method of claim 6 wherein the gas is injected in an amount sufficient to ensure that the adsorption of the surfactant on the formation is less than $100 \times 10^{16}$ grams per gram formation sand.

8. The method of claim 7 wherein the adsorption is less than $30 \times 10^{16}$ grams per gram formation sand.

9. The method of claim 6 wherein said gas is air and the amount of air injected is from about 0.5 to 50 percent of the pore volume of the formation.

10. The method of claim 9 wherein the surfactant is added to the solution in amounts of less than 5 wt. percent.

11. The method of claim 10 wherein the surfactant-containing solution is injected into the formation in an amount of from about 0.5 to 50 percent of the pore volume of the formation to form an intermediate slug and further including injecting additional oxygen-containing gas into the formation to produce a second slug thereof behind said intermediate slug and thereafter injecting additional solution into said formation from the input well to push the second air slug, the intermediate slug and the first-formed air slug through said formation to the output well.

12. In a method for recovery of crude oil from a subterranean oil-bearing formation, the steps which comprise successively injecting into the formation from an input well firstly an oxygen-containing gas in an amount sufficient to produce a slug thereof in the formation pushing ahead the crude oil and sufficient to produce in-situ surface active components in the crude oil, thereafter injecting surfactant-containing water solution into the formation from said input well in an amount from about 0.5 to 50 percent of the pore volume of the formation to form an intermediate slug, said water solution having dissolved therein a water-soluble surfactant which is compatible with the crude oil and reduces interfacial tensions between the water and crude oil to below 1 dyne/cm. when added to the water in amounts less than 1 wt. percent, injecting additional oxygen-containing gas into the formation to produce a second slug thereof behind said intermediate slug and thereafter injecting additional solution into said formation from the input well to push the second air slug, the intermediate slug and the first-formed air slug through said formation to the output well, and recovering oil from the output well.

UNITED STATES PATENT OFFICE
CERTIFICATE OF CORRECTION

Patent No. 3,599,716          Dated August 17, 1971

Inventor(s) James L. Thompson

It is certified that error appears in the above-identified patent and that said Letters Patent are hereby corrected as shown below:

Column 2, line 30, "1000 x $10^{16}$" should read -- 1000 x $10^{-6}$ -- and "100 x $10^{16}$" should read -- 100 x $10^{-6}$ --; line 31, "30 x $10^{16}$" should read -- 30 x $10^{-6}$ --; line 65, after "In" and before "are", insert -- this invention the water soluble surfactants --.

Column 3, line 18, "1,3,5trimethylcyclohexyl" should read -- 1,3,5-trimethylcyclohexyl --.

Column 6, line 8, "100 x $10^{16}$" should read -- 100 x $10^{-6}$ --; line 12, "30 x $10^{16}$" should read -- 30 x $10^{-6}$ --; line 72, "100 x $10^{16}$" should read -- 100 x $10^{-6}$ --; line 75, "30 x $10^{16}$" should read -- 30 x $10^{-6}$ --.

Signed and sealed this 21st day of March 1972.

(SEAL)
Attest:

EDWARD M. FLETCHER, JR.          ROBERT GOTTSCHALK
Attesting Officer          Commissioner of Patents